Nov. 14, 1961  J. L. CASSELL  3,009,137
VAULT PROTECTION

Filed April 10, 1958  5 Sheets-Sheet 1

INVENTOR.
JOSEPH L. CASSELL
BY
Philip S. McLean
ATTORNEY

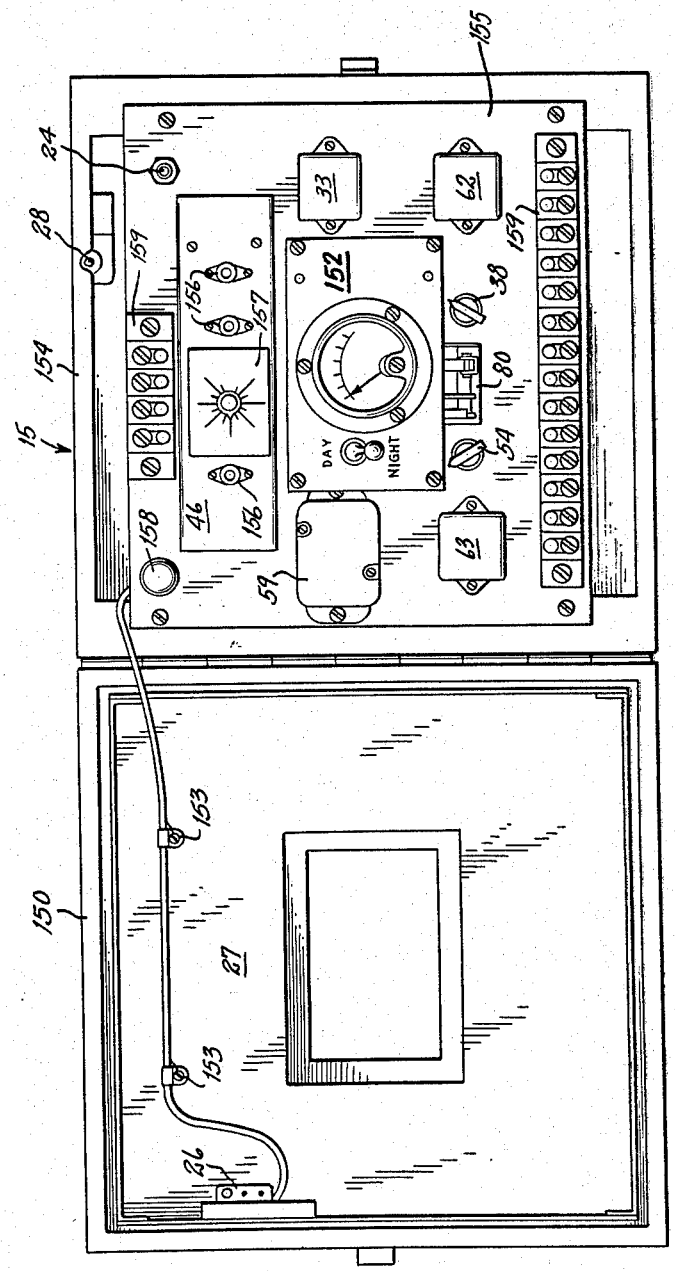

INVENTOR.
JOSEPH L. CASSELL ns patet Offic 3,009,137
Patented Nov. 14, 1961

3,009,137
VAULT PROTECTION
Joseph L. Cassell, New York, N.Y., assignor to The Reeve Electrical Co. Inc., New York, N.Y., a corporation of New York
Filed Apr. 10, 1958, Ser. No. 727,708
10 Claims. (Cl. 340—214)

The present invention relates to sound-actuated vault protective systems, and more particularly to a closed circuit system of this type supervised from a continuously attended central office.

The alarm system of the present invention comprises a central office supervisory unit including facilities operable at will for testing the operation of the alarm apparatus at the subscriber's premises. At the subscriber's premises there is at least one microphone located within the vault, at least one test bell controllable from the central office for testing the response of the microphone and the alarm circuits associated therewith, a control cabinet which is fully protected against tampering and which may be located outside the vault, and a holdup alarm circuit adapted for use during the day while the vault is open.

The location of the subscriber's control cabinet exteriorly of the vault permits it to be inspected and serviced by maintenance personnel during hours when the vault is locked. Thus, if the vault is provided with a time lock, trouble may be cleared without waiting for the time lock to open the vault.

A feature of the invention resides in the provision of a test circuit for testing the operation of the sound-actuated alarm circuits which provides a momentary test signal with the alarm circuit in its normal operative condition. The test signal is initiated by applying an alternating potential to the alarm circuit at the central office, or alternatively by reversing the polarity of the supervisory current in the alarm circuit. The test signal is delayed, however, until the alarm circuit has been restored to its normal condition at the central office. The test signal is originated by producing a sound in the vault, as by ringing a test bell.

Advantageously, the amplifier and relays used in the system may be of the plug-in type so that replacements may be quickly effected in the field and the units which have been removed may then be inspected and adjusted under shop conditions with complete test equipment and adjusting facilities available.

Various objects, features and advantages of the invention will become apparent upon reading the following specification together with the accompanying drawings forming a part thereof.

Referring to the drawings:

FIG. 4 is a front elevational view of the cabinet of FIG. 3 with the door open.

Figure 1:
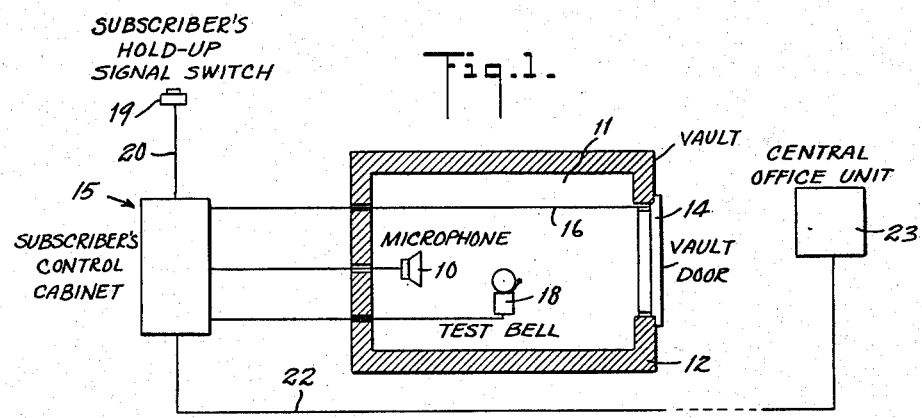
FIG. 1 is a diagrammatic illustration showing the general arrangement of the various units of the system.

Referring to FIG. 1, the system includes a microphone 10 which is located within a vault 11. The vault comprises walls 12. Access to the interior of the vault 11 is through a door 14 provided with the usual bolts and locks (not shown). The microphone 10 is connected to a subscriber's control cabinet designated generally as 15 and which is described in greater detail below. The control cabinet 15 is located exteriorly of the vault 11. There are switches, later to be described, which are closed when the vault door 14 is closed and the bolts have been shot home. These switches, which indicate that the vault is secure, are connected by a double-loop four conductor night circuit 16 to the control carbinet 15.

Disposed in the vault 11 in operative proximity to the microphone 10 is a test bell 18. The test bell is controlled from the central office and is used periodically for testing the operativeness of the alarm system. At least one hold-up alarm switch 19 is provided for use during the day while the vault door 14 is open. The hold-up alarm switch 19 is connected by a double-loop four conductor day circuit 20 to the control cabinet 15. A single conductor ground return circuit 22 extends from the subscriber's control cabinet 15 to a central office unit 23.

Figure 2:
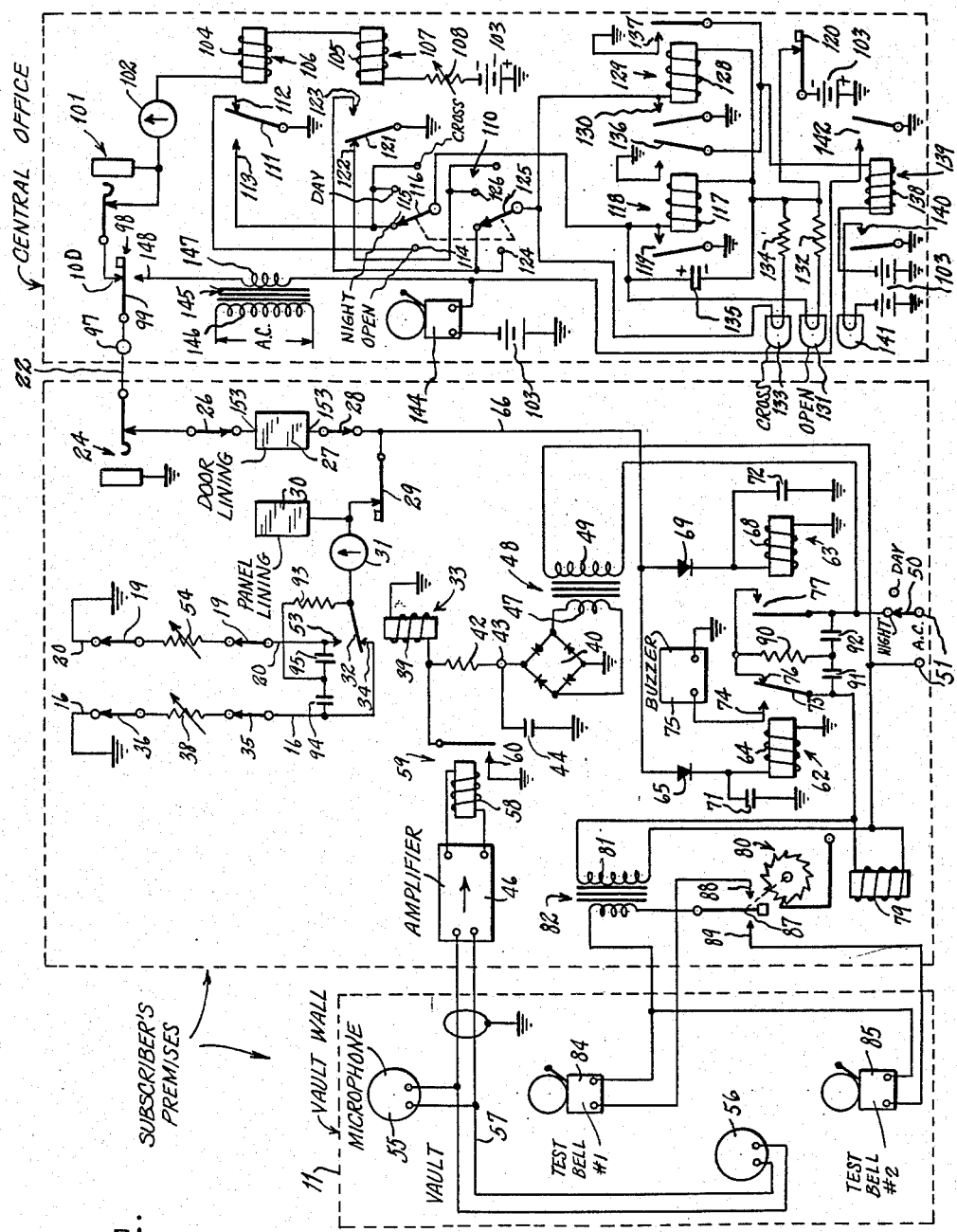
FIG. 2 is a schematic circuit diagram of the complete system.

Referring to FIG. 2, at the subscriber's premises, the central office conductor 22 extends through a telephone jack 24 located within the control cabinet 15 to a tamper switch 26 mounted on the door of the cabinet 15. From the door tamper switch 26, the circuit extends through a metal lining 27 mounted on and insulated from the door of the cabinet 15 to a pry-off switch 28 associated with the control cabinet 15. The pry-off switch 28 is mounted inside the cabinet 15 and opens the central office circuit if the cabinet should be pried off the wall in an attempt to disable the alarm system.

From the pry-off switch 28, the central office circuit extends through a test key 29 to a panel lining 30 and through a milliammeter 31 to the armature 32 of a night-day relay 33. The night-day relay 33 is shown in its energized condition for night service. In this condition, the central office night circuit extends from a front contact 34 of relay 33 and through vault loops included in the night circuit 16 and which include at least one vault bolt switch 35 and at least one vault door switch 36 to ground. A night circuit current adjusting resistor 38 is serially included in the night circuit 16 between the vault switches 35 and 36. While the vault door is closed and the bolts are shot home, the switches 35 and 36 remain closed and the central office circuit is closed therethrough.

The night-day relay 33 comprises an operating winding 39 which is energized from a bridge-type full-wave rectifier 40 through a current limiting resistor 42. The positive terminal 43 of rectifier 40 is connected to a filter capacitor 44 so that the rectifier 40 may also serve as a source of low voltage direct current for the operation of a transistor type amplifier 46, later to be described. The alternating current terminals of the rectifier 40 are supplied with current from the secondary winding 47 of a step-down transformer 48. The primary winding 49 of the transformer 48 is energized through a night-day switch 50 from alternating current terminals 51. Terminals 51 are connected to a commercial alternating current supply such as 115 volts 60 cycles. The D.C. output of rectifier 40 may conveniently be of the order of 16 volts. The night-day switch 50 is shown in its night position so that the operating winding 39 of the night-day relay 33 is continuously energized.

When the night-day switch 50 is operated to its day position, the rectifier 40 is deenergized and the night-day relay is released. During day operation, the armature 32 of relay 33 engages a back contact 53 which activates the day circuit 20. The central office circuit is then completed to ground through hold-up alarm loops included in the day circuit 20, hold-up alarm switches 19 and a day circuit current adjusting resistor 54. When the day circuit is in operation, the vault door 14 is open and the night circuit through vault switches 35 and 36 is out of service.

There are at least two microphones 55 and 56 located within the vault 11. The number of microphones used will depend upon the size of the vault and the acoustic properties, particularly with regard to reverberation, of the vault when the door is closed. Furs, for example have marked sound deadening properties and require more microphones and greater sensitivity than a safe deposit vault with reverberant metallic walls.

The microphones 55 and 56 are connected by a shielded line 57 to the input of amplifier 46. Acoustic energy picked up by either of the two microphones 55 or 56 is amplified and rectified by the amplifier 46 to produce a direct current output the amplitude of which is determined by the sound level within the vault 11. This rectified and filtered current is applied to the operating winding 58 of a marginal type vault alarm relay 59. The alarm relay 59 is provided with normally open contacts 60 which close when the sound level within the valut 11 exceeds a predetermined maximum value.

The contacts 60 of the alarm relay 59 are connected to short-circuit the normally energized winding 39 of night-day relay 33 in response to unusual noise in the vault 11. This action causes the central office circuit to be momentarily opened and transferred from the high resistance night circuit to the day circuit which is of lower resistance, thus giving a momentary "open" indication at the central office followed by a "cross" indication in a manner later to be described.

Two similar test relays designated 62 and 63 are provided for testing operation of the microphones 55 and 56 and of the vault alarm relay 59 by amplifier-detector 46 from the central office. The relays 62 and 63 have equal winding resistances and are adjusted to operate and release at the same current values. For this test, alternating current is applied to the central office circuit 22. Test relay 62 has an operating winding 64 which is connected to the central office circuit 22 through a rectifier 65 and by a conductor 66 which extends to the pry-off switch 28. The rectifier 65 is poled to prevent direct current flow through relay winding 64 when the central office circuit 22 is negative with respect to ground. The test relay 63 has an operating winding 68 which is similarly connected to the central office circuit 22 through a rectifier 69 and conductor 66. Rectifier 69 is also poled to prevent current flow through test relay winding 68 when the central office circuit 22 is negative with respect to ground, which is the case during normal night or day conditions for the central office circuit.

The winding 64 of test relay 62 is shunted by a capacitor 71 and the winding 68 of test relay 63 is similarly shunted by a capacitor 72. The capacitance of capacitor 72 is greater than that of capacitor 71 so that test relay 62 will release first when the application of alternating current to the central office circuit is discontinued or interrupted. As explained in greater detail below, the delayed release of test relay 63 after test relay 62 has first released provides a pulse the duration of which constitutes the test interval. It will be appreciated that a reversal of the polarity of the direct current source supplying the central office circuit 22 may be used instead of alternating current.

When test relay 62 operates, a movable contact 73 engages a front contact 74 to energize a test buzzer 75 which indicates to persons at the protected premises that the circuit is being tested by the central office operator. Contact 73 also disengages a back contact 76 to interrupt a test circuit which extends through normally open contacts 77 of test relay 63 to the operating winding 79 of a ratchet or stepping relay 80. The test circuit also extends to the primary winding 81 of a step-down transformer 82. The low-voltage secondary winding 83 of transformer 82 is connected to two test bells 84 and 85 located within the vault 11, the bell 84 being used to test microphone 55 and the bell 85 being used to test the microphone 56. A movable contact 87 of ratchet relay 80 first engages a stationary contact 88 and then engages a stationary contact 89 as the operating winding 79 of a ratchet relay 80 is successively energized. There may be an "off" position in which the circuit through movable contact 87 is open or the "off" position may be omitted. It is also immaterial whether actuation of contacts 87—88—89 takes place upon energization of winding 79 or upon deenergization of winding 79. When contacts 87—88 are closed, test bell 84 which is positioned to test microphone 55 is energized during the test interval. When contacts 87—89 are closed, test bell 85 which is positioned to test microphone 56 is energized.

A resistor 90 and capacitors 91 and 92 are connected to the contacts of the test relays 62 and 63 for spark suppression. Similarly, a resistor 93 and capacitors 94 and 95 are connected to the contacts of night-day relay 33 for spark suppression.

At the central office, the central office circuit conductor 22 is connected to a terminal 97. Terminal 97 is connected to a single-pole double-throw push button switch 98 for checking the operation of the microphones 55, 56 at the protected premises as well as the amplifier 46 and relay 59. The test switch 98 has a movable contact 99 which normally engages a back contact 100. The back contact 100 is connected through a closed circuit telephone or test jack 101 and a milliammeter 102 to the central office battery 103 through the serially connected operating windings 104 and 105 of marginal relays 106 and 107, respectively, and a line current adjusting resistor 108. Relay 106 responds to low line current and to an open circuit condition in the central office or the subscriber's premises. Relay 106 is normally operated during both day and night circuit conditions. Relay 107 is non-operated during night circuit conditions and responds to an increase in line current above the normal night circuit value of 20 milliamperes which would be caused by a "cross" or ground condition. The line current during the day is 30 milliamperes and both relays 106 and 107 are then normally held operated.

A double-pole four position control switch 110 is provided at the central office. These positions are designated, proceeding in a clockwise direction, as "Open," "Night," "Day" and "Cross." The "Open" and "Cross" positions are used to shut off the trouble signal with an open or cross condition on the central office circuit 22. The "Night" and "Day" positions are used with the vault closed at night or open during the day, respectively.

The "open" relay 106 has a movable contact 111 which normally engages a front contact 112. When relay 106 releases, the movable contact 111 transfers into engagement with a back contact 113. The front contact 112 is connected to a switch point 114 of control swtich 110 which is used only in the "Open" position of this switch. The back contact 113 is connected to a switch point 115 which is multipled to adjacent switch points so that it is effective in all positions of switch 110 except the "Open" position. The upper switch arm 116 of control switch 110 is connected to the operating winding 117 of a locking relay 118 controlled by the "open" relay 106. Relay 117 is provided with normally open locking contacts 119. The operating winding 117 is connected to the central office battery 103 through a non-locking normally closed reset push-button switch 120.

The "cross" relay 107 has a grounded movable contact 121 which normally engages a back contact 122 during the night condition or in the event of an open circuit condition on the central office conductor 22. The relay 107 is also provided with a front contact 123 which is engaged by the movable contact 121 during the day condition and in the event of a cross or ground on the central office circuit 22. The front contact 123 is connected to a switch point 124 of control switch 110. Point 124 is multipled to the adjacent point to complete a circuit through the lower switch arm 125 of control switch 110 in both "Open" and "Night" positions. The back contact 122 of relay 107 is connected to a switch point 126 of control switch 110 which is multipled to the adjacent switch point so that the back contact 122 is effective in the "Day" and "Cross" positions of control switch 110.

The lower switch arm 125 of control switch 110 is connected to the operating winding 128 of "cross" locking relay 129. Locking relay 129 is provided with normally open locking contacts 130. The operating winding 128, like the operating winding 117 of "open" locking relay 118, is connected to the central office battery through the reset push button 120 so that either or both of the locking relays 118 and 129 may be reset by a single operation of the reset button 120.

A capacitor 135 is connected in parallel with the operating winding 117 of "open" locking relay 118 to store energy from the short pulse generated by the fast acting micro switches used to protect doors and windows. An "open" signal lamp 131 in series with a voltage dropping resistor 132 is connected across the winding 117 of locking relay 118 to provide a visual indication when relay 118 is locked in. Similarly, a "cross" signal lamp 133 in series with a resistor 134 is connected in multiple with the operating winding 128 of "cross" locking relay 129.

Locking relay 118 is provided with normally open auxiliary contacts 136 and locking relay 129 is provided with normally open auxiliary contacts 137 which are connected in multiple to the operating winding 138 of a common alarm relay 139. When either of the locking relays 118 or 129 is operated, alarm relay 139 is operated. Relay 139 is provided with normally open contacts 140 which control a signal lamp 141. The signal lamp 141 may be common to a group of subscriber's circuits. The alarm relay 139 is also provided with another set of normally open contacts 142 which, when operated, connect ground to an alarm bell 144 energized from the central office battery 103.

A step-down transformer 145 has its primary winding 146 continuously energized from a commercial alternating current source. One side of the secondary winding 147 of transformer 145 is connected to ground when the common alarm relay 139 is operated. The other side of secondary winding 147 is connected to contact 148 of the test button 98 so that when the test button is operated, the central office circuit 22 is connected to receive the voltage of secondary winding 147 with respect to ground. This voltage may conveniently be 30 volts, 60 cycles.

Figure 3:
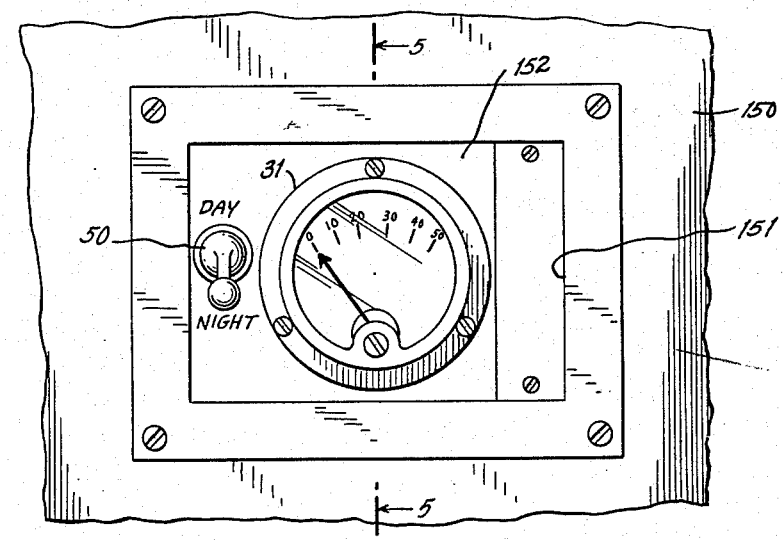
FIG. 3 is a fragmentary front elevational view of the subscriber's control cabinet with the door closed.

FIG. 3 shows the central portion of the front of the subscriber's control cabinet with the door 150 closed. The door 150 has a rectangular opening 151 behind which a subscriber's control panel 152 is located. The subscriber's milliammeter 31 and the night-day switch 50 are mounted on the control panel 152. The control panel 152 is formed of insulating material.

Figure 5:
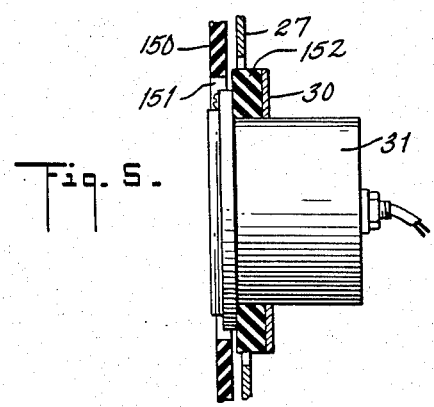
FIG. 5 is a fragmentary side view in section taken along the line 5—5 of FIG. 3, looking in the direction of the arrows.

To protect the system from attempts to tamper with the apparatus mounted on panel 155, a metal lining 30 is placed behind the panel as shown in FIG. 5. The panel lining 30 is connected to the central office circuit as shown in FIG. 2. Any drilling of the panel 152 or other tampering manipulation which places a ground on the lining 30 will give a "cross" indication at the central office. The door lining 27 is located behind and spaced from the door 150, being suitably insulated therefrom. Any attempt to drill a hole in the door 150 will ground the door lining 27 thereby giving a "cross" indication at the central office. Connections are made to the door lining 27 as indicated at 153 in FIGS. 2 and 4 so that the central office circuit includes the lining 27. Thus, any tampering with the door 150 may open the central office circuit instead of grounding it so that the tampering produces an "open" alarm indication at the central office.

The door tamper switch 26 is mounted on the door 150 as shown in FIG. 4. The pry-off switch 28 is mounted on the wall of the cabinet 154 to which the door 150 is hinged.

An apparatus panel or mounting plate 155, formed of metal, is located within the cabinet 154. The amplifier 46 is detachably mounted on the plate 155, as by a plug and jack arrangement not visible in the drawing. The amplifier 46 is shown as comprising three transistors 156 and a manually adjustable gain control 157. A fuse 158 is mounted on the panel 155 together with terminal blocks 159 for the connection of external conductors.

Figure 6:
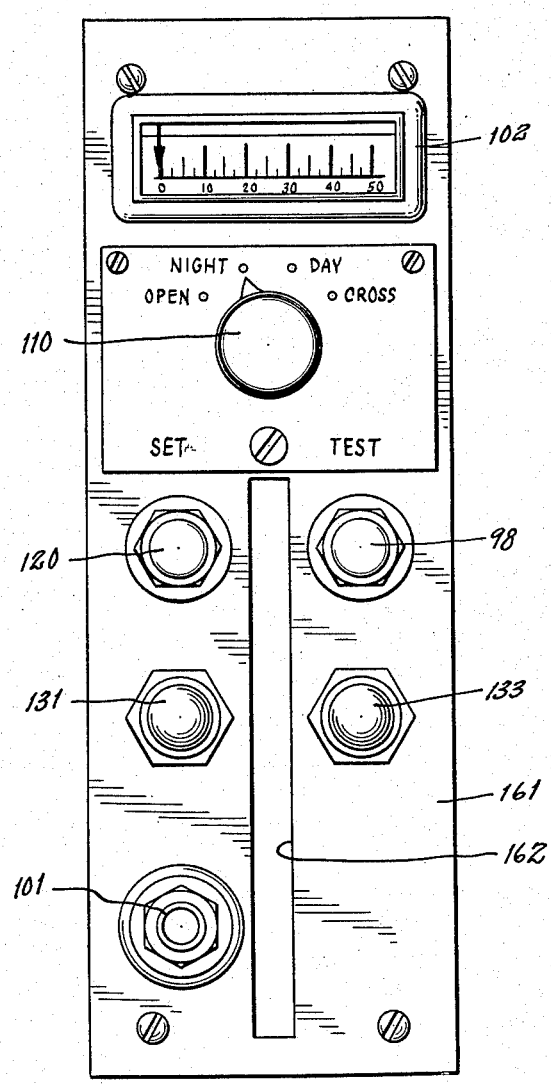
FIG. 6 is a front elevational view of a central office unit.
Figure 7:
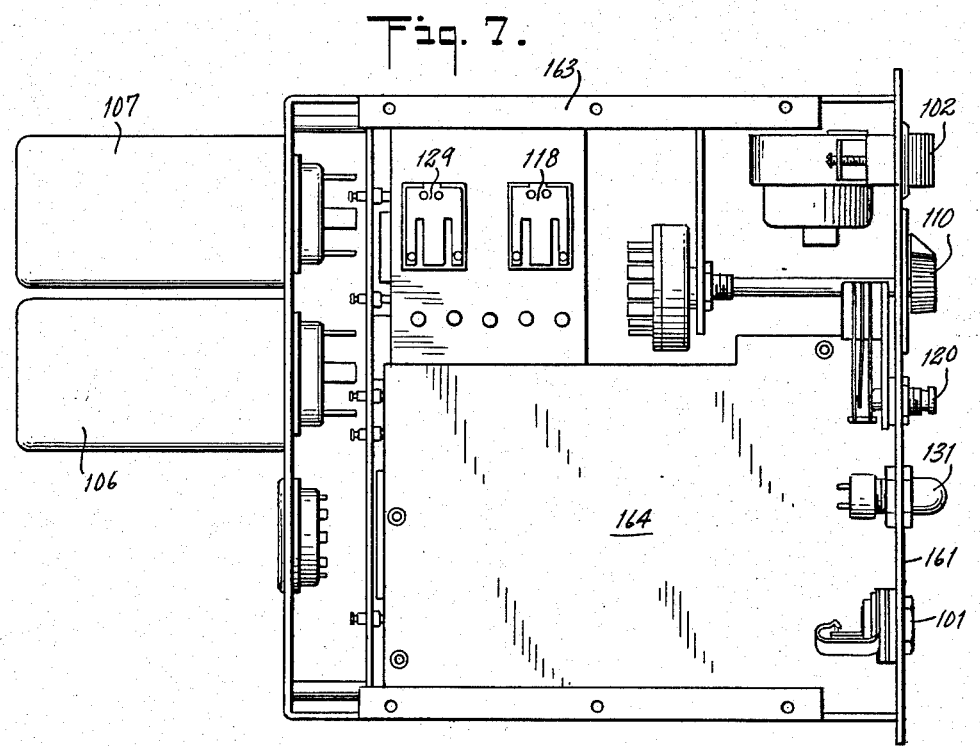
FIG. 7 is a side view of the unit of FIG. 6, viewed from the left with the left side cover removed.
Figure 8:
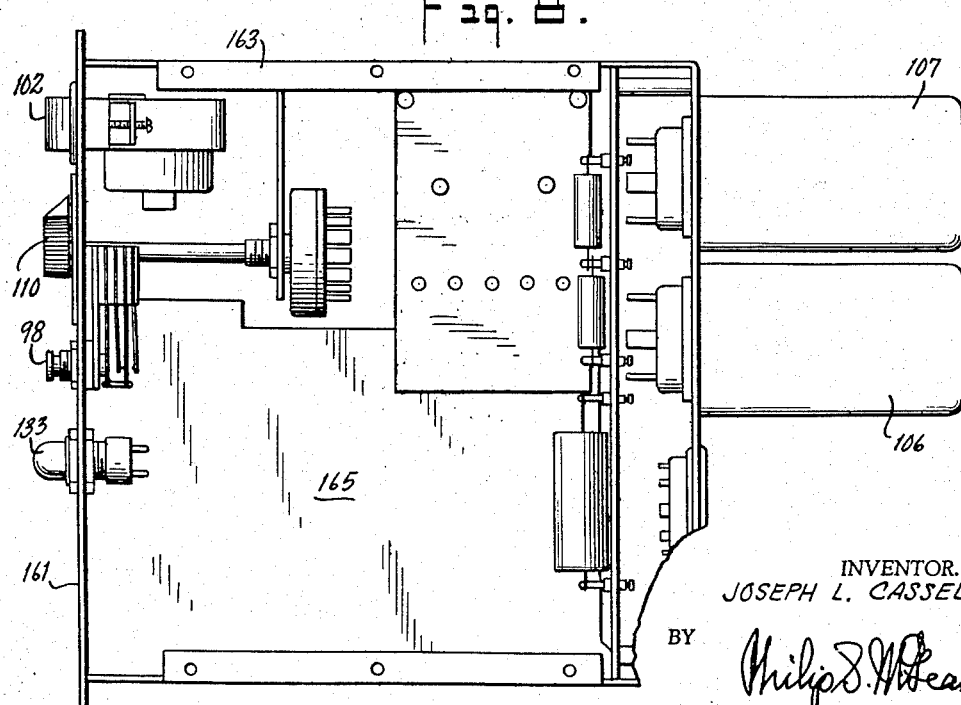
FIG. 8 is a side view of the unit of FIG. 6, viewed from the right with the right side cover removed.

The central office unit shown in FIGS. 6, 7 and 8 comprises a front panel 161 having a central vertically elongated pigeonhole slot 162 formed in its lower portion. A cover member 163 mounted on the rear of the front panel 161 provides top, rear and bottom walls for the central office unit. Removable side plates are mounted on the cover member 163. The side plates are not visible in the drawing, having been removed to illustrate the arrangement of apparatus in the interior of the central office unit.

The slot 162 constitutes the front opening of a pigeonhole which is further defined by side plates 164 (FIG. 7) and 165 (FIG. 8). The side plates 164 and 165 are laterally spaced and the top and rear edges of these plates are suitably interconnected by closure members (not shown) which exclude dust from the relays. The bottom of the pigeonhole is closed by the lower leg portion of the cover member 163. The pigeonhole is adapted to receive a record card (not shown) for the particular subscriber's circuit with which the central office unit is associated. The record card will project slightly from the front of the panel so that it may be easily grasped by the operator whenever needed. When inserted in the pigeonhole, however, the record card occupies no appreciable panel space.

In operation, the subscriber closes the vault door 14 which closes vault switches 35 and 36. The night-day switch 50 is thrown to its night position energizing the alarm relay 33. This transfers the central office circuit 22 to the night circuit loops 16 including the adjusting resistor 38 which drops the line current to its night value of 20 milliamperes. The central office operator turns the control switch 110 from its "Day" position to "Night" position. The test button 98 at the central office is pressed and released. One of the test bells 84 or 85 then tests one of the microphones 55 or 56, respectively, thereby giving a combined "open" and "cross" indication. The reset button 120 is then pressed and released. This clears the "cross" and "open" signals by releasing the locking relays 118 and 129. The test button 98 is again pressed and released to test the other microphone. Again the reset button is pressed and released to restore the locking relays. This procedure is normally repeated hourly throughout the night.

When the vault is opened, the night-day switch is operated to its "Day" position which places the hold-up alarm switches 19 in operation and the line current is increased to its normal daytime value of 30 milliamperes. The central office operator turns the control switch 110 from its "Night" position to its "Day" position where it remains while the vault is open. Central office relays 106 and 107 are both operated during the day and only "open" signals can be received, as by a break in the circuit or operation of one of the hold-up alarm switches 19. During the night, however, while the vault is locked, any circuit disturbance which causes the line current to increase or decrease appreciably from its normal value of 20 milliamperes will give a "cross" or "open" signal, respectively, either one of which is regarded by the central office operator as an alarm signal.

While the foregoing may be considered as a present preferred embodiment of the invention it will be realized that structure and arrangement may be modified and changed as regards this disclosure, all within the true intent and scope of the invention as set forth in the claims following.

What is claimed is:

1. In an alarm system, in combination, a closed circuit extending from a central office to protected premises, a source of direct current at the central office for energizing said circuit, a circuit element at the protected premises serially connected in said circuit for maintaining normal current flow in said circuit at a predetermined nominal value, current responsive signal means at said central office actuated by any substantial deviation in the magnitude of said normal current from said nominal value, test means at said central office for temporarily changing the character of said current flow while simultaneously rendering said signal means temporarily inoperative, said change in character including a reversal of the polarity of said normal current flow, and further test means at said premises responsive to said changed character of said current flow, said further test means including means responsive to discontinuance of said changed character of current flow by said first-named test means and connected after said discontinuance temporarily to cause substantial deviation of said normal current flow from said nominal value for actuation of said current responsive signal means.

2. In an alarm system including a closed circuit extending from a central office to protected premises, in combination: means at said central office for energizing said circuit; circuit means at said premises connected in said circuit for providing a normal current flow in said circuit having a predetermined nominal value; first test means at said premises unresponsive to said normal current flow and responsive to a change in the character of said current flow; second test means at said central office for temporarily changing said character of said current flow and restoring it to its normal character and value; alarm signal means at said central office responsive to appreciable deviation of said normal current flow from said nominal value, and pulse proceduing means at said premises connected to said circuit means and responsive to said first test means, said pulse producing means causing deviation of said normal current flow from said nominal value for a predetermined interval commencing after restoration of said current flow to its normal character by said second test means.

3. A system according to claim 2 further comprising a source of alternating current at said central office, said second test means being connected to said alternating current source for applying alternating current to said closed circuit when changing said character of said current flow, said first test means being responsive to disconnection of said alternating current source to actuate said pulse producing means.

4. An alarm system adapted to receive signals at a central office serving at least one premises protected by said system, said system comprising: a normally closed circuit extending between said office and said premises; a direct current source at said office connected to said circuit; a resistor at said office for reducing the current flow in said circuit which would otherwise be produced by said source to a predetermined nominal value; alarm initiating means at said premises connected to said circuit for causing the current flow therein to deviate from said nominal value; alarm receiving means at said office responsive to any substantial deviation of said current flow from said nominal value; a plurality of polarity sensitive circuit control means connected to said circuit to be unresponsive to the polarity of said circuit when energized by said direct current source; means at said office for temporarily applying current of reversed polarity to said polarity sensitive means over said circuit; and means including timing means connected to said polarity responsive means and to said circuit for producing a substantial deviation in said current flow from said nominal value in response to termination of said application of said reversed polarity to said polarity responsive means.

5. A system according to claim 4, in which said polarity sensitive means and said means including timing means comprises a pair of relays having their operating windings both connected to said circuit; at least one rectifier connected between said circuit and said relays for preventing energization of said operating windings from said circuit by said direct current source; means for causing the release times of said relays to differ; and a further circuit controlled jointly by said relays and connected to said first-named circuit, said further circuit being closed while one of said relays is released and the other relay operated, said further circuit, when closed, causing a substantial deviation in the current flow in said first-named circuit from said nominal value.

6. A vault alarm system adapted to protect a vault located at a subscriber's premises by means of an alarm signal received at a central office, said system comprising: a normally closed circuit extending between said premises and said office; a direct current source at said office connected to said circuit to energize the same; a resistor at said premises serially included in said circuit, said resistor reducing the current which would otherwise flow in said circuit to a predetermined nominal value; microphone means disposed in said vault; amplifier-detector means connected to said microphone means for response to an abnormal noise level in said vault when said vault is closed; controllable sound emitting means in said vault disposed to actuate said amplifier-detector means; sound actuated relay means responsive to actuation of said amplifier detector means both by said abnormal noise level and by said sound emitting means, said relay means being connected to said closed circuit to cause the current flow therein to deviate substantially from said nominal vaule; alarm signal receiving means at said office connected to said circuit for response to any substantial deviation of said current flow from said nominal value; test means at said office for temporarily energizing said circuit with current including current of polarity opposite to the polarity of said direct current source; a pair of relays at said premises, both relays having operating windings connected to said circuit for energization therefrom; means at said premises rendering both of said relays unresponsive to the polarity of said direct current source and responsive to said opposite polarity; means at said premises causing the release times of said relays to be different; and a test circuit controlled by said relays, said test circuit being closed while one of said relays is operated and the other released, said sound emitting means being connected for operation during closure of said test circuit.

7. A system according to claim 6, in which said relays unresponsive to the polarity of said source comprise a separate rectifier serially connected between each relay winding and said circuit.

8. A system according to claim 6, wherein said means for causing the release times of said relays to be different comprises a separate capacitor connected in multiple with each of said operating windings, the capacitances of said capacitors being different.

9. A system according to claim 8, further comprising a separate rectifier connected in series with the parallel combination of the operating winding of one of said relays and one of said capacitors.

10. A vault alarm system adapted to protect a vault located at a subscriber's premises by utilization of an alarm signal transmitted from said premises to a central office, said system comprising: a normally closed circuit extending between said premises and said office; a direct current source at said office connected to said circuit to energize the same; a resistor at said premises serially included in said circuit, said resistor reducing the current which would otherwise flow in said circuit to a predetermined nominal value; a plurality of microphones disposed in said vault; amplifier-detector means connected to said plurality of said microphones; sound actuated relay means connected to said amplifier-detector means and responsive to an abnormally high noise level in proximity to any of said microphones; a plurality of controllable sound emitting means each disposed in proximity to at least one of said microphones for actuating said relay means independently of said noise level, said relay means being connected to said circuit for causing the current flow therein to deviate substantially from said nominal value in response to actuation of said relay means; alarm signal receiving means at said central office connected to said circuit for response to any substantial deviation of said current flow from said nominal value; test means at said central office for temporarily energizing said circuit with current including current of polarity opposite to the polarity of said direct current source; a pair of relays at said premises, both of said relays having an operating winding connected to said circuit for energization therefrom; means at said premises rendering both of said relays unresponsive to current of the same polarity as said direct current source and responsive to current of said opposite polarity; means at said premises for causing the release times of said relays to be different; a test circuit controlled by said relays, said test circuit being closed while one of said relays is operated and the other released; and sequentially operative switching means controlled by said test circuit, said switching means having a plurality of switching conditions, each of said sound emitting means being separately connected for operation in one of said switching conditions during closure of said test circuit.

References Cited in the file of this patent

UNITED STATES PATENTS

| | | |
|---|---|---|
| 1,867,834 | Hopkins | July 19, 1932 |
| 2,493,576 | Foss | Jan. 3, 1950 |
| 2,732,544 | Bagno | Jan. 24, 1956 |
| 2,779,936 | Louden | Jan. 29, 1957 |
| 2,782,405 | Weisz et al. | Feb. 19, 1957 |
| 2,871,284 | Wills | Jan. 27, 1959 |
| 2,873,305 | Boddy | Feb. 10, 1959 |
| 2,943,304 | Schmidt | June 28, 1960 |
| 2,944,252 | Muehter | July 5, 1960 |